Sept. 15, 1931.    T. D. CAMPBELL    1,823,387
METHOD OF HARVESTING AND THRASHING GRAIN
Filed Nov. 12, 1925    2 Sheets-Sheet 1
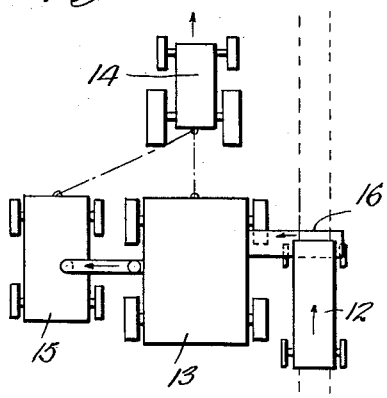
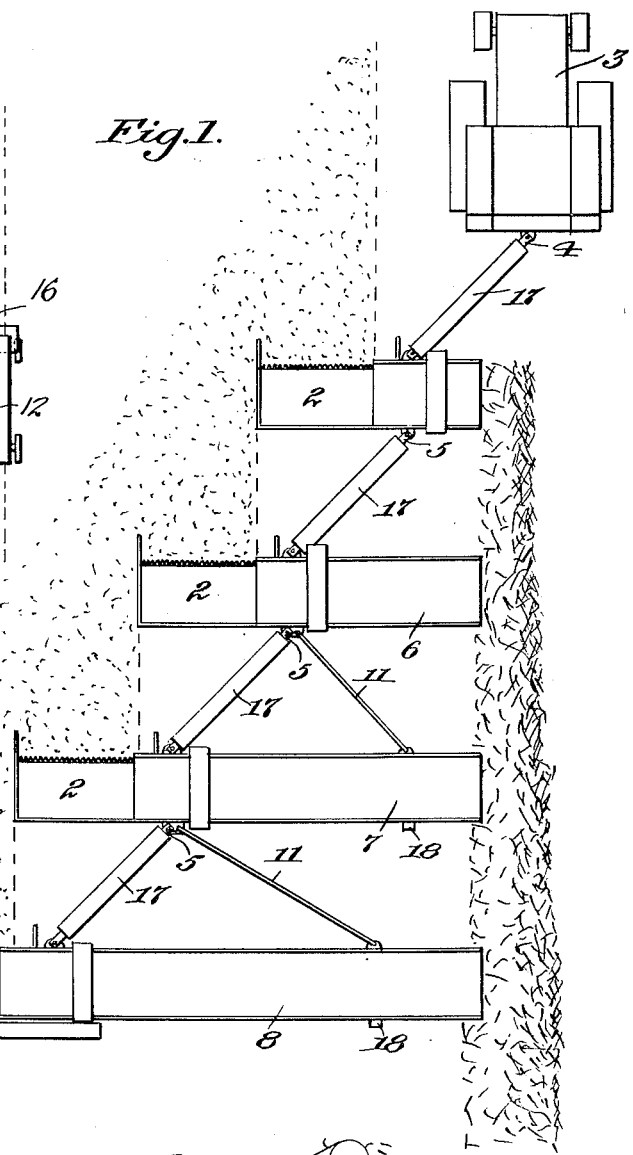
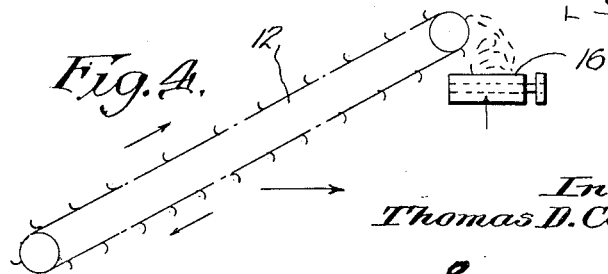
Inventor:
Thomas D. Campbell,
Lyon & Lyon
Att'y.

Sept. 15, 1931.   T. D. CAMPBELL   1,823,387
METHOD OF HARVESTING AND THRASHING GRAIN
Filed Nov. 12, 1925   2 Sheets-Sheet 2
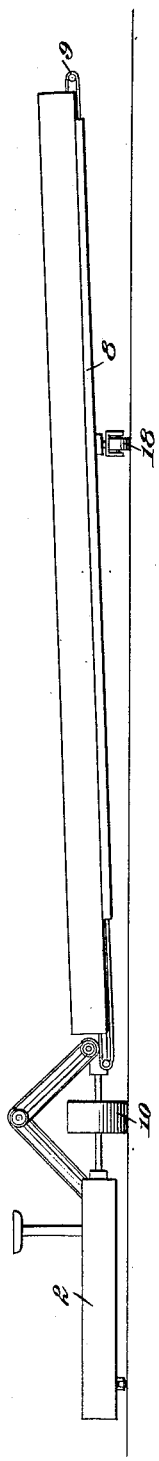
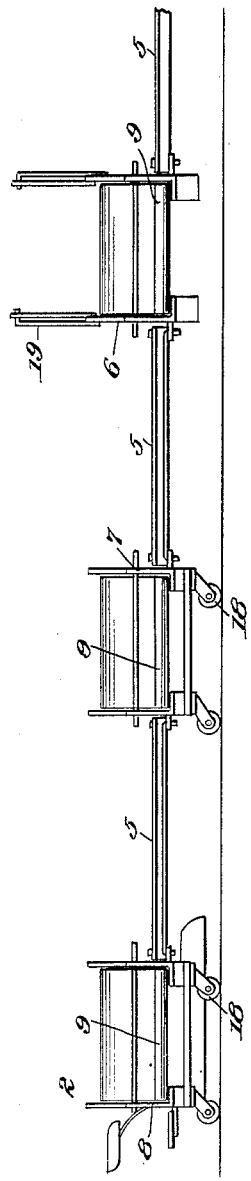
Inventor:
Thomas D. Campbell,
Lyon & Lyon
Att'y.

Patented Sept. 15, 1931

1,823,387

UNITED STATES PATENT OFFICE

THOMAS D. CAMPBELL, OF HARDIN, MONTANA

METHOD OF HARVESTING AND THRASHING GRAIN

Application filed November 12, 1925. Serial No. 68,575.

This invention relates to a method and means of harvesting and thrashing grain, such for example, as wheat, rye, flax, oats, and the like, and also beans, alfalfa, timothy, and in fact all other grains and seeds.

Heretofore in harvesting grain, when it is not desired to leave the grain in the field for a sufficient period of time so that the grain may be simultaneously harvested and threshed, it has been the general practice to cut the grain by harvesters or binders which take the grain stalk as cut and bind the same into bundles, dropping the bundles on the field. Subsequently these bundles are shocked or stood in piles so that the grain may dry out and ripen. The grain is then in scattered shocks or piles in the field and considerable work is necessary in order that such grain may be properly delivered to a thresher for separating the grain proper from the stalk.

An object of the present invention is to provide a method and means of harvesting which eliminates the cost of this shocking of the grain, including the cost of twine and other expenses.

Another object of the present invention is to provide a method and means of farming which eliminates the necessity for binding the stalks of grain as the same is harvested.

Another object of the invention is to provide a method and means of harvesting whereby one or more binders, harvesters, headers, mowers, or other grain machines, can be operated by one man.

Another object of the present invention is to facilitate and decrease the cost of getting the cut grain after ripening in the field into a thresher.

Another object of the invention is to provide a method and means of farming, whereby the grain or seeds can be harvested and threshed under the various conditions of maturity without being manually handled.

Another object of the invention is to provide a method and means of farming, whereby the hazards from the weather, such as rain, snow, high winds, hail, etc., are greatly reduced.

Another object of the invention is to provide a method and means of farming which greatly reduces the time necessary to harvest, mature and thresh the grain.

Other objects will appear hereinafter throughout the specification.

The present invention consists in a process and apparatus by which the outputs of a plurality of harvesters, headers, mowers, or other grain, seed or hay cutting machines, are deposited in a single windrow whereby the grain, seed or hay is sufficiently gathered so that it is not necessary either to bind the grain or to shock the same in order that the cut grain, hay or seed may be permitted to properly ripen for thrashing within the field. Furthermore this depositing of the output of a plurality of machines or the conveying of the stalks from a plurality of successive cuts into a single windrow positions the cut grain, hay or seed so that it may be readily loaded by a loader and conveyed to a thresher, thus decreasing the usual cost and greatly decreasing the time of gathering the scattered piles of shocked grain for thrashing. In the preferred form of the method and apparatus of the present invention this common windrow of grain can be continuously picked up by a hay loader or other suitable apparatus attached to a traveling thresher or combined harvester and thresher, so that by mere passage of the thresher or combined harvester and thresher along the windrow the grain is both simultaneously picked up and threshed. This operation can be performed when a combined harvester and thresher is used either by removing the header or cutter bar and discharging the windrowed grain directly into the feeder box or cylinder, or by depositing the windrowed grain on the draper of the combined harvester and thresher. When the header or cutter bar is not removed, the device which picks up the grain from the windrow can be attached or detached in a minimum of time.

By the present invention not only are the above objects and advantages obtained, but also it is possible to use many old harvesters, binders or headers, or other grain cutting machines having binding mechanism, for harvesting grain, in which the old binding mechanism of the same has become too badly worn for use, as the binding mechanism is not necessary to the process or apparatus of the present invention. Moreover, when it is necessary to secure new harvesters or binders, etc., the cost of the same is considerably less. In addition to these advantages, it requires less skill to operate the harvesting equipment as there is no twine to watch or bundles to adjust or bundle carriers to trip and one man can easily operate a plurality of harvesters. Furthermore, it is found that valuable time and expense is saved due to the elimination of the use of twine and all of the delays and losses which accompany broken twine and loose bundles. Moreover, the elimination of the necessity of binding the grain eliminates maintenance and operating cost as the strain on the machinery is much less and much less power is required for operating by the new harvesting method and apparatus. Furthermore, the present invention is found to greatly eliminate the present labor problem to the farmer, dispensing with much of the farm labor heretofore required and permits the grain to be harvested and threshed in a considerably less period of time with the result that the hail risk, or other damage by the elements, is lessened. Furthermore, my improved method and apparatus for farming is adapted for successful use in dirty grain and unripe grain or grain which is in varying stages of maturity, whereas the combined harvester and thresher now being used can be used successfully only when the grain is fully matured, evenly ripened and free from green weeds and foul growths.

The present method and apparatus for harvesting grain will be best understood from the following description of a preferred method and means embodying the new invention for harvesting grain. Reference is therefore made to the accompanying drawings in which there is illustrated diagrammatically suitable apparatus for harvesting grain by the preferred method.

In the drawings:

Figure 1 is a plan view of the grain cutting and depositing apparatus.

Figure 2 is an elevation of the end portion of such apparatus.

Figure 3 is a plan view of a thresher and loading device showing the preferred method of conveying the grain in the common windrow to a thrashing apparatus.

Figure 4 is an elevation of the loading element of the apparatus of Figure 3.

Figure 5 is a side elevation of the grain cutting and depositing apparatus disclosed in Figure 1, broken away so as not to include the first grain cutting machine and the tractor.

Referring to the drawings, the field of grain is preferably cut by a plurality of grain cutting means 2, hereinafter referred to as machines, which may be of any suitable construction such as above indicated, being here shown as the common form of harvester from which the binder heads have been removed. These machines 2 are positioned one after the other and offset so that each successive machine forms a cut in the same grain field. Each of the machines may be drawn from a common point by means of horses or the tractor 3, indicated. 4 indicates a draft bar from the tractor 3 to the first machine 2, and 5 indicates draft connecting links between the different machines. The first machine 2 of the successive machines having its binder head removed, deposits its cut as close to the binder frame as possible leaving a windrow of grain. The second machine is indicated as having a grain carrier 6, approximately the same length as the width of the cut of the preceding machine, but adapted to deposit its output to enlarge the windrow formed by the forward machine 2. Each succeeding machine is provided with a carrier such as 7 and 8 of longer width so that the output of all the machines of the apparatus is deposited in such common windrow. The carriers of each succeeding machine preferably discharge at a point slightly shorter than the preceding machines where the apparatus is to be employed on a thick grain field in order to prevent the windrow becoming overly high.

The conveyor herein illustrated is one that has been developed by me and consists of a light, well constructed framework, as designated by the numeral 8, with rollers 9—9 at each end with canvas conveyor having cross slats similar to the common binder canvas and forms the subject of another application to be filed by me at a later date. However, any suitable conveyor having either canvas and slats and driven from the machine or by any other suitable power take-off or power drive can be used. The conveyor may be constructed to use leather straps with slats, similar to the old style straw carrier, or link chains with cross slats, endless belts, pneumatic pipes, or any of the well recognized mechanical methods or means of moving unthreshed grain, hay, etc.

There is also provided draft bars 11 or interconnecting draft links, as shown in Figure 1, to be used when the conveyor is of such length that it cannot be properly supported and drawn by attaching to the cutting machine only. Short conveyors, such as shown by numeral 6 in Figures 1 and 5, do not need this additional draft link 11. It is also necessary to support the long conveyors by casters or other wheels, as indicated by numeral 18, but these may be dispensed with and truss and tie rods 19 may be used instead, such as support the short conveyor 6. Accordingly, it is much simpler to operate or control the different machines in their proper off-set positions than with the general practice heretofore employed with the result that the entire control of the machines 2 can be placed under a single hand, who can use the connecting platforms 17 between the machines.

After the cutting and depositing of the grain stalk or headed grain in such common windrow, the grain is there left until it becomes properly ripened for thrashing. The grain may then be picked up from the windrow by passing along the line of the windrow any suitable loading device, such as indicated by 12 in Figure 4. It is not necessary that the numerous teams and bundle wagons should be driven over the field to collect the grain, as is the case with grain shocked in the field, and considerable expense in farm labor is avoided and the ripened grain may be more readily gathered for harvesting. The loader 12 may, if desired, deposit the grain or other crops into wagons or other suitable means for carrying the grain to a thresher maintained in a stationary position, but preferably the loader 12 is rigidly connected with a moving thresher such as indicated at 13 in Figure 3 and deposits the grain as picked up on a chute or conveyor 16 for conveying the grain directly into the thresher where it is continuously threshed as picked up. The thresher 13 is indicated as drawn by suitable means, such as a tractor 14, or by horses, and provided with a grain receptacle 15 for the threshed grain. It is obvious that by the arrangement of apparatus shown in Figure 3 by mere passing of the outfit along the line of the windrow of grain, the grain is picked up and threshed.

While the method and apparatus for harvesting grain herein described is well adapted for accomplishing the object of the invention and has been in actual practice by me to effect a very substantial saving in the cost of harvesting grain, it is understood that it is not desired to limit the invention to the particular method and means herein set forth, but the invention includes all such modifications, changes and substitution of equivalents as come within the proper interpretation of the appended claims.

I claim:

1. A method of harvesting grain consisting of making a plurality of successive and simultaneous cuts, each cut offset longitudinally from the adjacent cut, conveying the cut grain of each cut in a single direction and depositing the grain of the first cut loosely upon the ground and the grain of each cut succeeding loosely upon the grain of the preceding cut to form a single windrow, and leaving the loose grain in such windrow unbound, to ripen and weeds to cure.

2. A method of harvesting grain consisting of making a plurality of successive simultaneous cuts, each cut offset longitudinally from the adjacent cut, conveying the grain of each cut in a parallel direction and depositing the grain of each cut upon the stalks of grain previously cut and deposited with the stalks lying substantially flat upon the ground to form a single windrow and upon each other and leaving the grain in such windrow unbound to ripen and weeds to cure.

3. A method of harvesting grain consisting of making a plurality of successive simultaneous cuts, each cut offset longitudinally from the adjacent cut, conveying the grain of each cut in a parallel direction and depositing the grain of each cut upon the stalks of grain previously cut and deposited with the stalks lying substantially flat upon the ground to form a single windrow and upon each other and leaving the grain in such windrow unbound to ripen and weeds to cure, and then passing a thresher having a loading device along the line of the windrow to simultaneously pick up the grain and thresh the same.

Signed at Washington, D. C. this tenth day of November 1925.

THOMAS D. CAMPBELL.